Feb. 13, 1934.   W. TRAMMELL   1,946,509
INSECT TRAP
Filed April 4, 1932
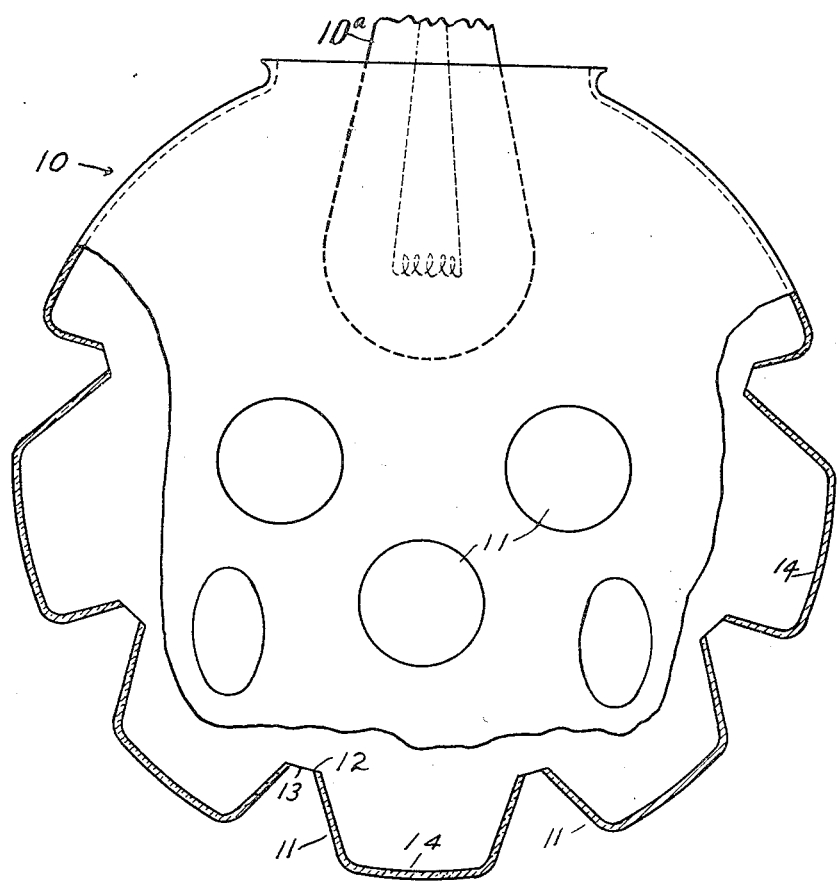
INVENTOR
W. Trammell
BY
ATTORNEY Patented Feb. 13, 1934

1,946,509

UNITED STATES PATENT OFFICE 1,946,509

INSECT TRAP

Webb Trammell, United States Navy

Application April 4, 1932. Serial No. 603,158

1 Claim. (Cl. 43—122)

(Granted under the act of March 3, 1883, as amended April 30, 1928; 370 O. G. 757)

This invention relates to an insect trap and has for its object to provide an improved construction and arrangement for attracting and entrapping insects.

A further object of this invention is to provide an improved insect trap which includes any suitable source of attraction, such as a mechanical vibration or sound, a poisonous or non-poisonous bait giving off an attractive odor, a source of illumination of a usual or special light characteristics, or a combination of the same.

A still further object of this invention is to provide an improved lamp globe within the interior of which the light is adapted to be mounted in fixed relation to the globe and within which globe a supply of insect poison or powder may be placed and which will have openings allowing insects or flies to easily enter into the globe and cause them to be killed by the poison placed therein or in the absence of the poison, by starvation or lack of water.

With the above and other objects in view, this invention consists in the construction, combination and arrangement of parts as will be described more fully hereinafter.

The single figure in the drawing is a partly sectional and partly elevational view of a globe and source of attraction comprising this invention.

There is shown at 10 a globe, generally spherically in shape although any other suitable shape may be used, in which is mounted an electric lamp 10a or other source of attraction for insects. The globe 10 is made generally of some solid material of uniform contour such as a frosted or colored glass, so that the emanations therethrough from the source of attraction, here shown as an electric light 10a, will be somewhat dulled or changed in characteristics in passing therethrough.

A plurality of inverted cones 11 are made in the bottom and sides of the shell of the globe and extending inwardly with the axes 12 of these cones pointing generally toward the light of lamp 10a. An opening 13 is formed in each apex 12, the opening being of such a size that a fly or insect can comfortably crawl therethrough. The light is adapted to shine through said openings brighter and afford greater attraction to the insects than the surface of globe 10.

In operation, a source of destruction is placed within the globe 10, such as a supply of insect powder or poison which is scattered on the uniform interior surface 14 of the globe 10 before the same is secured to its mounting about the source of attraction. Such powder or poison is prevented from escaping from the globe 10 by the height of the cone openings 13 above their bases. The uniform contour of globe 10 is adapted to permit such powder or poison to be moved within globe 10 by ordinary movements of the globe 10 and without escaping therefrom. Insects and flies are drawn toward the source of attraction or light and therefore will buzz about the globe 10. Due to the frosting or coloring of the globe 10 and the openings 13 point toward the source of illumination, the flies or insects will be drawn to the more prominent attraction or brighter light appearing through the opening 13 after having been attracted to the globe in general and will crawl through cone 11 and opening 13. Due to the fact that cones 11 are inverted into the globe, the insects and flies will find it easy to crawl into the opening 13 but very difficult to find their way out again through the opening 13. In the meantime, the flies and insects having been attracted to within the globe 10, they will be exposed to the insect poison or powder scattered on the interior surface 14 and will be exterminated before they find their way out through the opening 13.

If the source of attraction is other than a source of illumination, as when it is a mechanism for producing an attracting sound, or a suitable bait giving off an attractive odor, the trap will operate in a similar manner, that is, the insects will be attracted to the trap in general, and the source of attraction will be more prominent through the openings 13, thus causing them to crawl in through the inverted cones 11 to the interior of the trap, where they will be exposed to the effect of the poisonous bait or the powder scattered on the interior surface 14, and be exterminated.

The globe 10 is open at its top only for the reception of the electric light 10a, which preferably extends partially through said open top. This construction and arrangement prevents the contamination or deterioration of the powder or poison by the light 10a and avoids air currents within the globe 10, and affords light at a fixed point toward which the openings 13 are at all times directed. An insect trap globe 10 is thereby provided which is of uniform external contour and which will maintain its efficiency in a large number of different possible positions.

The arrangement set forth in this invention will be equally effective without the use of an exterminator within the globe 10, the poison merely serving to kill the insects more quickly than were they to die from starvation or lack of water.

It will be understood that the above description and accompanying drawing comprehend only the general and preferred embodiment of my invention, and that various changes in construction, proportion and arrangement of parts may be made within the scope of the appended claim without sacrificing any of the advantages of the invention.

The invention described herein may be manufactured and used by or for the Government of the United States of America for governmental purposes without the payment to me of any royalties thereon.

I claim:

A fly or insect trap comprising in combination a glass globe of uniform diameter, contour and thickness, having a substantial opening through its top, the edge of said opening being formed of a narrow flange by which said globe is adapted to be solely held, an electric light of substantially lesser diameter than said opening and extending partially through said opening, said globe being provided in its bottom and at spaced intervals about its lateral periphery with a plurality of hollow frustrums of cones formed integral with the glass of the globe and open at both ends, the longitudinal axes of said cones when extended are adapted to converge at the glow point of said light, said globe being substantially translucent and the openings through the cones and the top opening being thus adapted to afford greater attraction for insects than other portions of the globe, and a destructive fluid within said globe of substantially uniform depth in all the vertical and lateral positions to which the globe may be moved, and the length of said cones being in excess of the depth of the fluid and adapted to be surrounded by and to prevent the escape therethrough of the fluid in said different positions of the globe.

WEBB TRAMMELL.